United States Patent Office 2,879,904
Patented Mar. 31, 1959

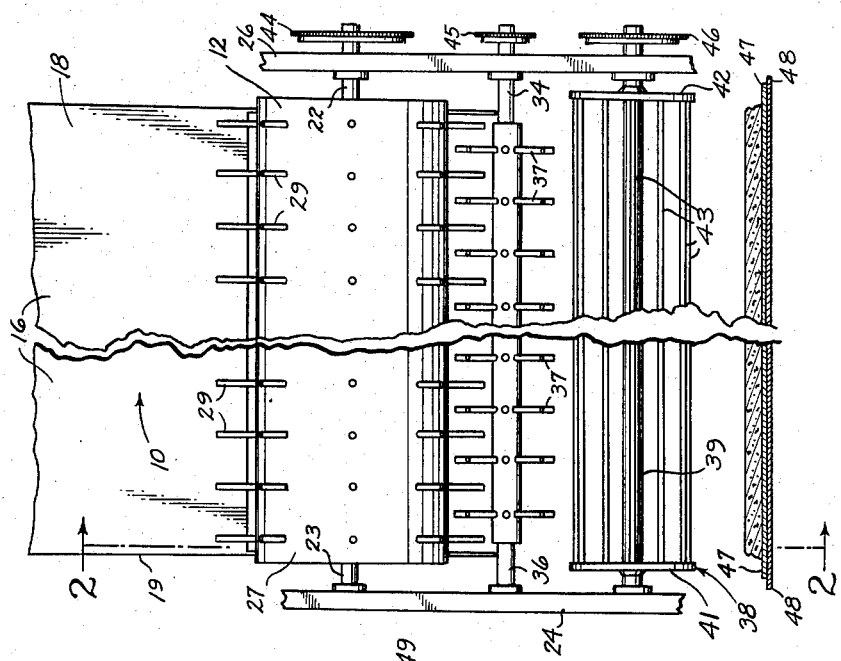
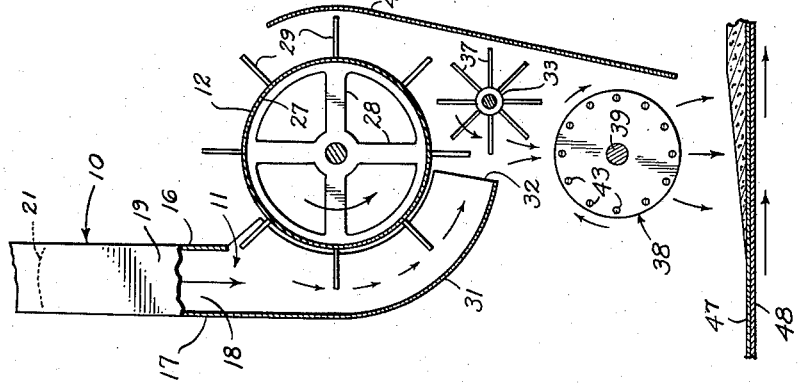
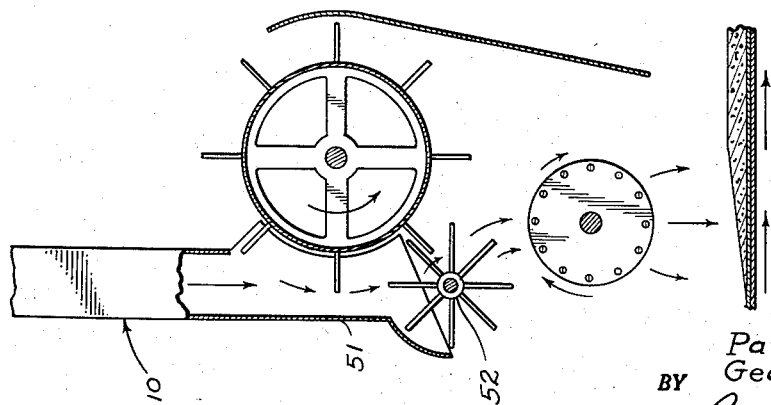
INVENTORS
Paul R. Walsh
George D. Mohr

2,879,904

FEEDING APPARATUS FOR FIBROUS PARTICLES

Paul R. Walsh and George D. Mohr, Eugene, Oreg., assignors to Clear Fir Products Co. Inc., Springfield, Oreg., a corporation of Oregon Application November 19, 1956, Serial No. 623,247

6 Claims. (Cl. 214—17)

This invention relates to feeding apparatus for fibrous particles and more particularly to volumetric feeding apparatus capable of delivering a continuous flow of fibrous particles in regulated quantities.

Fibrous particles, such as wood chips, wood shavings, and sawdust, quite commonly must be fed at a continuous rate in regulated quantities from some point of storage during the manufacture of composite products from these materials. Difficulties have arisen in distributing these materials because of their compressible nature and other characteristics. If a uniform rate of feed is to be maintained, when volumetric apparatus is used, it is obvious that the bulk density of the material should be kept relatively constant. Efforts to construct a volumetric feeding apparatus wherein the mass of fibrous particles is metered out in an uncompressed state have not been entirely satisfactory, the mass of particles tending to slough out of the machine, or bridge up so as to prevent discharge of the particles. To overcome these difficulties, feeding mechanisms have been designed which attempt to create a regulated flow by first compressing the fibrous particles a predetermined amount, and then metering the mass of particles while in a compressed state. However, by compressing the fibrous particles, a pulsating delivery is created by reason of the clumps of material which tend to break off and fall out of the feeding devices. This is particularly troublesome when an evenly distributed layer of material is sought to be maintained. Further, with frangible materials, such as wood splinters, destruction of the fibrous particles occurs, affecting the product made therefrom.

Generally, it is an object of this invention to provide a feeding apparatus for fibrous particles which takes care of the hereinabove described difficulties in a highly practical and satisfactory manner.

More specifically, it is an object of this invention to provide a feeding apparatus which will distribute particles continuously at a uniform rate without imparting to the fibrous mass a predetermined degree of compression.

It is another object of this invention to provide a feeding apparatus wherein the particles are moved as a non-agitated mass, similar to a blanket, down a delivery channel so constructed and arranged that the compression of the mass remains substantially the same as it was in the storage portion of the channel.

Further, it is an object of this invention to provide a feeding apparatus having a delivery channel so constructed and arranged that cavitation and sloughing out of the material from the channel is minimized. Another object of this invention is to provide such a feeding apparatus wherein the material metered by the apparatus is delivered to an underlying conveying means at a uniform rate without fluctuations.

These and other objects are attained by the present invention, various novel features of which will become more fully apparent as the following description is read in conjunction with the accompanying drawings, wherein:

Fig. 1 is an end view of a feeding apparatus embodying this invention with parts removed to reveal the details of the apparatus;

Fig. 2 is a side view along the line 2—2 of Fig. 1; and

Fig. 3 is a side view of a slightly modified form of this invention.

Referring to the drawings, an embodiment of this invention is shown as it might be utilized in the manufacture of compressed hardboard from disintegrated wood material such as wood shavings. The apparatus, in general, comprises a chute or channel, indicated generally at 10, arranged in substantially an upright vertical position with the mouth of the channel, indicated at 11, overlying and adjacent the periphery of a feed roll 12. Channel 10, as illustrated, has a rectangular cross-section and is comprised of a forward wall 16, a rear wall 17, and side walls 18 and 19 affixed together in any suitable manner. Fibrous material, in this case wood shavings, is fed into the top of the chute and is maintained at an approximately constant level by an appropriate conveyor system, or manually if desired. As illustrated, the level of the material in the chute lies along line 21, although it is obvious that the chute could be made considerably larger, or be equipped with a suitable collection chamber or surge bin, if it is desired to maintain a larger amount of material in storage above the feeding apparatus. The level of material in the space above the feeding apparatus should preferably be kept fairly constant so that any compression imparted in the lower levels of material held by chute 10 tends to be constant. It should be noted, however, that the only compression applied to the material is created by the weight of the overlying layers of material only. From the lower portions of channel 10 until such time as the material is finally distributed over the underlying conveying means, the material is permitted to retain its original degree of compression.

Feed roll 12 is rotatably mounted in a conventional manner, shaft extensions 22 and 23 of the feed roll support shaft being held by conventional bearing assemblies located in side walls 24 and 26. The feed roll itself is comprised of a substantially cylindrical central core 27 of relatively large diameter, radially spaced about the central support shaft by appropriate spacing members, such as members 28. The core of the feed roll has projecting from its outer periphery a plurality of spike elements 29 adapted to pass into and engage the mass of fibrous material contained in channel 10.

Rear wall 17 of channel 10 extends downwardly of mouth 11 beyond the lower end of forward wall 16. With reference to Fig. 2, wall 17 includes an arcuate portion, indicated at 31, which is spaced from and curves around an arc segment of core 27. As can be seen with reference to side wall 18 in Fig. 2, the lower extremities of side walls 18 and 19 continue downwardly from mouth 11, with the inner edge portions of these walls lying adjacent the periphery of the core 27 and the outer edge portions fastened to arcuate portion 31. Thus the lower extremities of the side walls and the arcuate portion of rear wall 17 co-operate to form an apron portion carried by channel 10 at the mouth of the channel which defines with the periphery of core 27 a closed path about a portion of the periphery of the feed roll.

An important element of this invention is the fact that after the mass of fibrous material leaves the mouth of channel 10, the course of material through the feeding apparatus is through a closed path about the periphery of the feed roll which accommodates a flow of material without reducing the bulk density of the material. Thus in Fig. 2, the lower extremities of the side walls and arcuate portion 31 of the rear wall is spaced from core 27 so that the cross-sectional configuration of the path adjacent feed roll 12 is substantially the same as the cross-sectional configuration of the lower portion of channel 10. In this manner, the material passing through the channel tends to move as a blanket downwardly past the periphery of the feed roll as it is grabbed by spikes 29 and moved down through the apron portion carried by the channel.

Spikes 29 extend a considerable distance into the path defined by the apron portion. For instance, when the path defined by the apron portion has a width of approximately ten inches, spike elements approximately five inches in length are found to be highly practical. In general, the spike elements should extend into the path defined by the apron portion a distance equal to at least about one-third the minimum width of the path defined by the apron portion. When so constructed, the spikes grab enough of the blanket of material adjacent the feed roll to move the material without merely eroding away part of the material. The spike elements also tend to prevent the material from sloughing out of channel 10.

By curving the lower portion of rear wall 17 about an arc segment of feed roll 12, additional structure is provided for preventing material from sloughing out of channel 10. The arcuate path so defined is particularly desirable when finely disintegrated material is being distributed, such as fine sawdust, this material being somewhat more free-flowing than wood shavings.

By constructing the apron portion so that its cross-sectional configuration corresponds to the cross-sectional configuration of channel 10, a metering section is provided which controls the amount of material passing by the feed roll. This metering section assures that the material flowing from channel 10 flows at the same rate and in more or less of a blanket as it passes by the feed roll.

Rotatably mounted adjacent the feed roll and at the outlet end of the closed path defined by the apron portion and the outer periphery of the feed roll is a picking roll, indicated at 33. Shaft extensions 34 and 35 of the picking roll are rotatably mounted in suitable bearings in side walls 24, 26. Picking roll 33 includes a plurality of spike elements 37 spaced on the core of the picking roll so as to pass between the spike elements of the feed roll as the two are rotated together. The picking roll is rotated at a considerably faster rate than the feed roll and in an opposed direction, and serves to clear any fibrous particles which may be retained on the feed roll by brushing them from the feed roll. By way of example, the feed roll may be rotated at speeds of less than 1 r.p.m., whereas the picking roll may be rotated at speeds up to about 2000 r.p.m. By rotating the picking roll at a substantially faster rate than the feed roll, matter carried by the feed roll is not only dislodged from the feed roll, but is also diffused to a certain extent as it falls from the picking roll.

Below the picking roll and generally in the path particles occupy in falling from the picking roll is a dispersing roll 38. As shown, this roll is of a squirrel-cage construction having a central support shaft 39, wall supports 41 and 42, and rods 43 extending between and held by the wall supports. Shaft 39 is rotatably supported at its ends in side walls 24 and 26 in a conventional manner. In operation, dispersing roll 38 is rotated, so that material falling from feed roll 12 and picking roll 33 is further dispersed by striking rods 43 moving in the path of the falling material.

Mechanism is provided for rotating the feed roll, the picking roll, and the dispersing roll in the manner described. As shown, affixed to shaft extension 22 of the feed roll, shaft extension 34 of the picking roll, and shaft 39 of the dispersing roll are sprockets 44, 45, and 46, respectively. These sprockets are driven by ordinary drive chains and motor (not shown).

In the embodiment illustrated, the feeding apparatus of this invention is shown as it may be utilized for laying an evenly distributed layer of wood particles upon a plate prior to the formation of hardboard. Thus, the particles fall from the picking roll and dispersing roll onto a plate element or caul plate 47 moving along beneath the apparatus on a conveyer belt 48, which is moving to the right in Fig. 2. By employing the apparatus described in this invention, a regulated, continuous layer of wood material is deposited on the caul plate which is free from sporadic hollows and depressions. A retaining wall 49 is included to direct scattered material downwardly on the caul plate.

A modified form of this invention is illustrated in Fig. 3. Rear wall 51 of channel 10 in this instance extends directly down past the feed roll to a point overlying a picking roll 52 which, in this embodiment, is located to the rear of the feed roll. The flow of material from channel 10 is substantially along a vertical path past the feed roll. The flow of material past the feed roll is controlled by the metering action of the section of the path which lies adjacent the rearmost portion of the feed roll, the cross-sectional area at this point being substantially the same as the cross-sectional area of channel 10. In the embodiment shown in Fig. 3, the picking roll is rotated so that the portions of the roll which pass adjacent the feed roll are moving in the same direction as the feed roll, the faster rate of rotation of the picking roll serving to remove the fibrous matter from the picking roll.

As is apparent from the foregoing description, a novel apparatus has been disclosed which is operable to dispense volumetrically fibrous material continuously in regulated quantities, without the necessity of first compressing the material and raising its bulk density. The walls of the apron portion carried by channel 10 are spaced relative to the core of the feed roll so that the opposed inner surfaces of the path defined by the apron and core are spaced from each other a distance at least equal, approximately, to the spacing of opposed wall portions of channel 10. In this manner an undiminished bulk density of the fibrous particles is maintained. Flow of the fibrous particles past the feed roll is controlled by the spike elements projecting from the feed roll, and the metering action created by the spacing of the apron portion. Since the bulk density is not increased by introducing a degree of compression, upon leaving the outlet end of the path about the feed roll, the material breaks apart easily under the action of the picking roll. The picking roll, together with the dispersing roll located thereunder, disperse the particles sufficiently to permit an evenly distributed layer of material to be deposited on the caul plate traveling underneath the dispersing roll.

The invention in its broadest aspects is not limited to the specific embodiment shown and described, as various modifications are possible without departing from the inventive concept disclosed herein. It is desired not to be limited to the specific embodiments shown, and it is intended to cover all modifications and arrangements which would be apparent to one skilled in the art and that come within the scope of the appended claims.

It is claimed and desired to secure by Letters Patent:

1. Feeding apparatus for fibrous particles comprising a substantially upright collection and delivery chute having a mouth at the base thereof for the discharge of material, said chute having opposed and stationary side wall portions defining a hollow interior for the chute of rectangular and substantially uniform cross section extending upwardly from the mouth of the chute, a driven feed roll rotatably mounted transversely of said chute adjacent the mouth thereof, said feed roll having a plurality of spike elements projecting outwardly from a central core, a stationary apron portion at the mouth of said chute having inner surface portions defining with peripheral surface portions of said core a closed path about a portion of the periphery of said feed roll which is a continuation of the hollow interior of said chute, the surfaces defining said path being spaced from each other a distance at least equal approximately to the spacing of opposed wall portions of said channel, thereby to maintain an undiminished bulk density of said fibrous particles as they pass adjacent said feed roll along said path, and a driven picking roll rotatably mounted adjacent said feed roll and at the outlet end of the closed path defined by said apron portion for clearing fibrous particles from said feed roll.

2. Feeding apparatus for fibrous particles comprising a substantially upright collection and delivery chute having a mouth at the base thereof for the discharge of material, said chute having opposed and stationary side wall portions defining a hollow interior for the chute of rectangular and substantially uniform cross section extending upwardly from the mouth of the chute, a driven feed roll rotatably mounted transversely of said chute adjacent the mouth thereof, said feed roll having a plurality of spike elements projecting outwardly from a central core, a stationary apron portion at the mouth of said chute having inner surface portions defining with peripheral surface portions of said core a closed path about a portion of the periphery of said feed roll which is a continuation of the hollow interior of said chute, the surfaces defining said path being spaced from each other a distance at least equal approximately to the spacing of opposed wall portions of said channel, thereby to maintain an undiminished bulk density of said fibrous particles as they pass adjacent said feed roll along said path, and a driven picking roll having spike elements projecting between the spike elements of said feed roll rotatably mounted adjacent said feed roll and at the outlet end of the closed path defined by said apron portion for clearing fibrous particles from said feed roll, said picking roll being driven at a substantially greater rate than said feed roll so as to diffuse the fibrous particles cleared therefrom.

3. Feeding apparatus for fibrous particles comprising a substantially upright collection and delivery chute having a mouth at the base thereof for the discharge of material, said chute having opposed and stationary side wall portions defining a hollow interior for the chute of rectangular and substantially uniform cross section extending upwardly from the mouth of the chute, a driven feed roll rotatably mounted transversely of said chute adjacent the mouth thereof, said feed roll having a plurality of spike elements projecting outwardly from a central core, a stationary apron portion at the mouth of said chute having inner surface portions defining with peripheral surface portions of said core a closed path about a portion of the periphery of said feed roll which is a continuation of the hollow interior of said chute, the surfaces defining said path being spaced from each other a distance at least equal approximately to the spacing of opposed wall portions of said channel, thereby to maintain an undiminished bulk density of said fibrous particles as they pass adjacent said feed roll along said path, the peripheral outline of the ends of said spike elements extending into said path a distance at least about one-third the minimum width of said path, and a driven picking roll rotatably mounted adjacent said feed roll and at the outlet end of the closed path defined by said apron portion for clearing fibrous particles from said feed roll.

4. The feeding aparatus of claim 3 wherein the picking roll has a plurality of spike elements projecting between the spike elements of said feed roll and is driven at a substantially greater rate than said feed roll so as to diffuse the fibrous particles cleared therefrom, and which further comprises a dispersing roll located beneath said picking roll operable to disperse the particles falling from said picking roll.

5. Feeding apparatus for fibrous particles comprising a substantially upright collection and delivery chute having a mouth at the base thereof for the discharge of material, said chute having opposed and stationary side wall portions defining a hollow interior for the chute of rectangular and substantially uniform cross section extending upwardly from the mouth of the chute, a driven feed roll rotatably mounted transversely of said chute adjacent the mouth thereof, said feed roll having a plurality of spike elements projecting outwardly from a substantially cylindrical central core, a stationary apron portion at the mouth of said chute having inner surface portions defining with peripheral surface portions of said core a closed path about a portion of the periphery of said feed roll which is a continuation of the hollow interior of said chute, the surfaces defining said path being spaced from each other so as to define about an arc segment of said core an arcuate path having a cross-sectional configuration corresponding to the cross-sectional configuration of said chute, the peripheral outline of the ends of said spike elements extending into said path a distance at least about one-third the width of said path, and a driven picking roll rotatably mounted adjacent said feed roll and at the outlet end of the closed path defined by said apron portion for clearing fibrous particles from said feed roll.

6. Feeding apparatus for fibrous particles comprising a substantially upright collection and delivery chute having a mouth at the base thereof for the discharge of material, said chute having opposed and stationary side wall portions defining a hollow interior for the chute of rectangular and substantially uniform cross section extending upwardly from the base of the chute, a driven feed roll rotatably mounted transversely of said chute adjacent the mouth thereof, said feed roll having a plurality of spike elements projecting outwardly from a substantially cylindrical central core, a stationary apron portion at the mouth of said chute having inner surface portions defining with peripheral surface portions of said core a closed path about a portion of the periphery of said feed roll which is a continuation of the hollow interior of said chute, the surfaces defining said path being spaced from each other so as to define about an arc segment of said core an arcuate path having a cross-sectional configuration corresponding to the cross-sectional configuration of said chute, the peripheral outline of the ends of said spike elements extending into said path a distance at least about one-third the width of said path, a driven picking roll having spike elements projecting between the spike elements of said feed roll rotatably mounted adjacent said feed roll and at the outlet end of the closed path defined by said apron portion for clearing fibrous particles from said feed roll, said picking roll being driven at a substantially greater rate than said feed roll so as to diffuse the fibrous particles cleared therefrom, and a dispersing roll located beneath said picking roll operable to disperse the particles falling from said picking roll.

References Cited in the file of this patent

UNITED STATES PATENTS

| 171,011 | Griscom | Dec. 14, 1875 |
| 1,667,428 | Mason | Apr. 24, 1928 |
| 1,724,319 | Schunemann | Aug. 13, 1929 |
| 2,316,213 | Arelt | Apr. 13, 1943 |

FOREIGN PATENTS

| 1,030,612 | France | Mar. 18, 1953 |